UNITED STATES PATENT OFFICE.

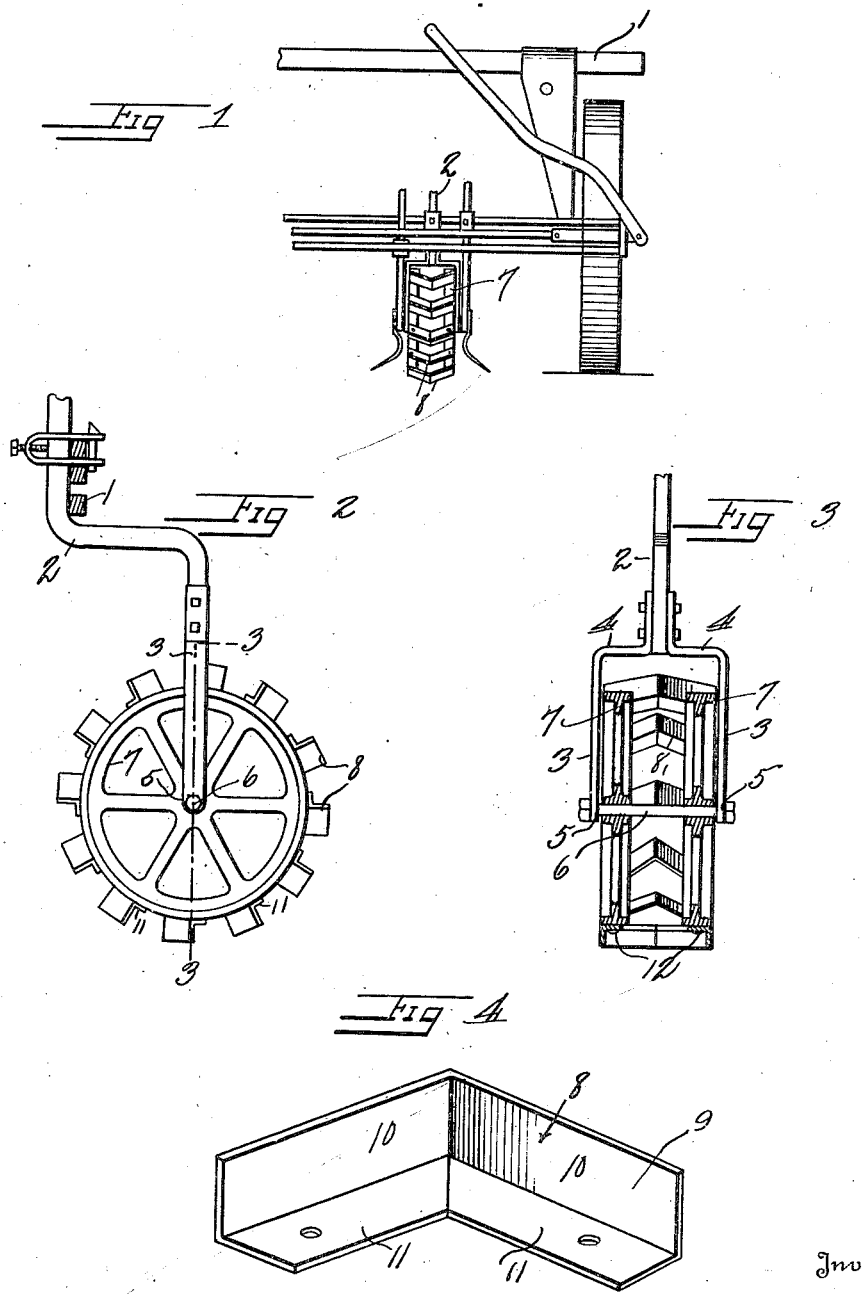

ROYAL McLEOD, OF FORT COLLINS, COLORADO.

SUGAR-BEET-CULTIVATOR ATTACHMENT.

1,210,185. Specification of Letters Patent. Patented Dec. 26, 1916.

Application filed April 18, 1916. Serial No. 92,002.

*To all whom it may concern:*

Be it known that I, ROYAL MCLEOD, a citizen of the United States, residing at Fort Collins, in the county of Larimer, State of Colorado, have invented certain new and useful Improvements in Sugar-Beet - Cultivator Attachments; and I do hereby declare the following to be a full, clear, and exact description of the invention, such as will enable others skilled in the art to which it appertains to make and use the same.

The present invention is directed to improvements in crust breakers, and has for its object to so construct a device of this character that the same can be conveniently attached to a conventional form of beet cultivator.

A further object of the invention is to provide a crust breaker so constructed that it will effectually cut or break the crust of the beet rows without injuring the plants.

The usual practice in beet cultivation is to break or cut the soil before the plants appear, and it is a further object of this invention to provide a novel form of device for accomplishing this.

With these and other objects in view, this invention resides in the novel features of construction, formation, combination and arrangement of parts to be hereinafter more fully described, claimed and illustrated in the accompanying drawing, in which:—

Figure 1 is a fragmentary rear elevation of a cultivator, showing the device in place thereon. Fig. 2 is a side elevation of the same. Fig. 3 is a sectional view on line 3—3 of Fig. 2. Fig. 4 is a detail perspective view of one of the cutters.

Referring to the drawing 1 indicates a section of a frame of a conventional form of cultivator for the cultivation of beets.

A shank 2 is provided and is connected in any suitable manner to the cultivator, said shank having its lower end clamped between the upper ends of the arms 3, said arms being bent horizontally as at 4, and thence downwardly, and have their lower ends provided with bearings 5 in which are journaled the opposite ends of the axle 6.

Rotatably mounted on the axle are wheels 7, said wheels serving to support the cutters 8, which are formed from suitable angle metal and are bent intermediate their ends so as to provide angularly disposed cutting blades 9, which are formed by the webs 10 of the cutters, while the other webs 11 have their adjacent ends disconnected, but in close contact. The webs 11 have their outer ends secured to the rims of the wheels 7 by clamping bolts 12.

The cutters 8 serve to hold the wheels in spaced relation. It will be of course understood that any number of cutters can be employed, as deemed necessary.

From the foregoing description it will be seen that as the cultivator is moved across the field that the cutters will rotate with the wheels, during which time the blades 9 will successively engage the rows so as to break the soil. It will be further noted that the webs 11 will serve to limit the cutting action of the blades 9, and will also during their movement cut the crust.

What is claimed is:—

A crust breaker comprising a shank, arms secured to the shank, an axle supported by the arms, wheels rotatably engaged with the axle, cutters formed from angle metal and bent to provide angularly disposed sections, the webs of certain of the sections constituting blades, the other webs of said sections having their ends engaged with the rims of the wheels, means for connecting the last named webs to the rims, and means for attaching the shank to a cultivator.

In testimony whereof I affix my signature in the presence of two witnesses.

ROYAL McLEOD.

Witnesses:
JNO. W. WALKER,
C. A. POLLEY.